May 2, 1933.  C. J. MIDDLETON ET AL  1,906,705
MEASURING INSTRUMENT
Filed April 6, 1931
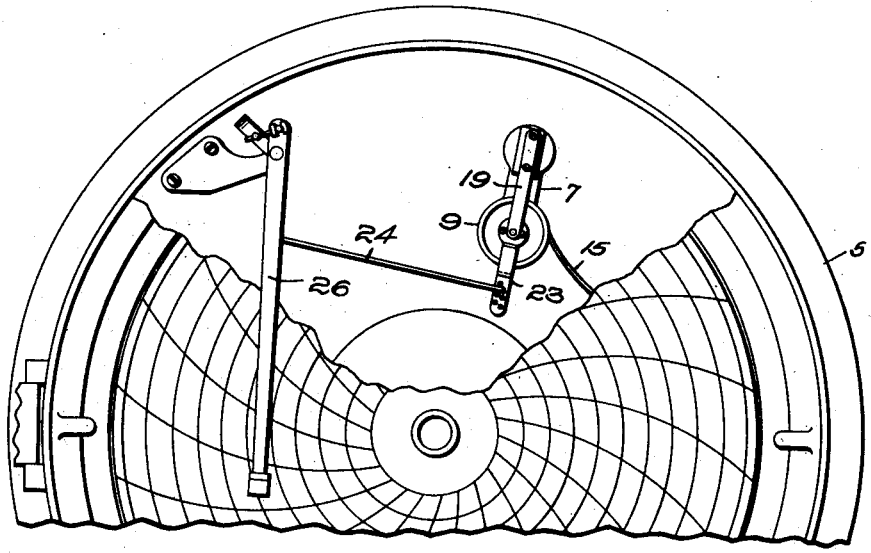
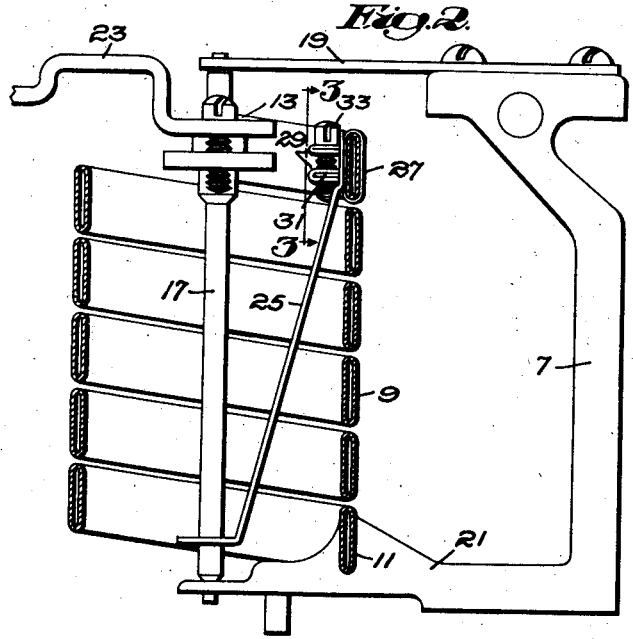
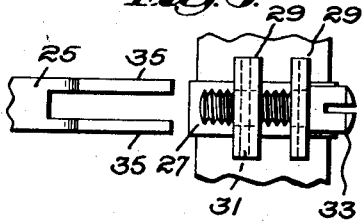
Inventors:
Charles J. Middleton
Arthur G. Beal Patented May 2, 1933

1,906,705

UNITED STATES PATENT OFFICE

CHARLES J. MIDDLETON, OF BROCKTON, AND ARTHUR G. BEAL, OF FOXBORO, MASSACHUSETTS, ASSIGNORS TO THE FOXBORO COMPANY, OF FOXBORO, MASSACHUSETTS, A CORPORATION OF MASSACHUSETTS

MEASURING INSTRUMENT

Application filed April 6, 1931. Serial No. 527,876.

This invention relates to measuring instruments of the type wherein a sensitive member is distortable responsively to the fluctuations of some variable which it is desired to measure, as, for instance, temperature or pressure. The particular object of the invention is to provide such an instrument embodying improved means for connecting such sensitive device to the part governed thereby, as, for example, a pointer or pen. In its more specific aspects our invention may be considered as an improvement on the device shown in the patent to E. H. Bristol 1,195,334, August 22, 1916, and we have herein illustrated by way of example an instrument of the type shown in that patent and embodying our improvements.

In the drawing:—

Fig. 1 is a partial front elevation of a recording instrument, broken away;

Fig. 2 is a central section through the sensitive device on a larger scale; and

Fig. 3 is a detailed plan on a still larger scale showing parts as seen from the line 3—3 of Fig. 2 but separated one from another.

In the specific instrument shown there is mounted in the casing 5 of the instrument in a suitable support 7 a pressure responsive element exemplified by the helically coiled Bourdon tube 9 having a fixed end 11 mounted upon said support and a sealed free end 13, the tube being of flattened cross-sectional shape and connected by a small capillary pipe 15 (see Fig. 1) to a source of pressure. It will be understood that an increase in pressure, which may be caused by a variation in temperature, will tend to unwind the helically coiled tube 9, thereby producing in the tube a rotary tendency about the axis of the helix.

Located within the tube and substantially coaxial with the helix is a shaft 17 journalled at its opposite ends in bearings formed by the arms 19 and 21 secured to or forming a part of the support 7. An arm 23 is rigidly secured to the shaft to permit utilization of its rotative movement, herein by connecting rod 24 (Fig. 1) which operates by means not fully shown but unnecessary to show or describe in detail, a recording pen 26, a recording instrument having been chosen for purposes of illustration.

Herein the shaft 17 is connected to the free end 13 of the helically coiled tube 7 adjacent the sealed end of the latter by a suitably radially flexible and circumferentially rigid driving connection, herein consisting of a flat strip 25 having the greater dimension of its cross section tangentially disposed. The strip 25 may be connected at one end to the shaft 17 by solder and extends obliquely to the free end 13 of the tube.

As contrasted with the construction of the Bristol patent above referred to, the strip 25 is connected to the end of the tube by a mechanical clamp avoiding the use of solder. For some purposes it is desirable for purposes of calibration to make the connection after the parts have been assembled in the instrument which renders soldering inconvenient. Also a soldering operation may adversely affect the tube. For instance, in the case of a steel tube plated to protect it from oxidization or corrosion it has hitherto been necessary to scrape the plating from the tube in order to secure a base for the solder. This removes the protective plating, leaving it exposed to corrosive agents. In some cases the heat of soldering may disturb the calibration of the tube.

Referring to Figs. 2 and 3, the clamp herein shown takes the form of a band 27 clasping the outer wall of the tube adjacent the free end thereof, the band in the form herein shown encircling the tube and terminating, preferably at the interior diameter of the coil, in lugs 29 preferably greater in width than the body of the band, for purposes which will presently appear and as is clearly shown in Fig. 3. The rear lug may support a nut 31 receiving a screw 33 which connects the lugs, the head of the screw preferably being disposed toward the front of the tube conveniently accessible for manipulation. The end of the strip 25, as best seen in Fig. 3, is slotted to provide the arms 35 which may slide under the overhanging parts of lugs 29 to be received between the same and the wall of the tube. If screw 33 is then set up, the band will be clamped about the tube and at the same time a slight tilting of the lugs will provide for clamping the arms 35 against the tube with sufficient firmness to provide the necessary driving force in a circumferential direction and to obviate objectionable play when the strip 25 yields radially, yet without marking or crushing the hollow tube.

It will be seen that the band 27 may readily be either slipped over the free end of the tube or snapped into position about it and the arms 35 may be slipped under the lugs 29. The connection is easily made and can be easily slackened to permit adjustment.

In the drawing we have shown the arm 23 connected to the shaft by means devised by Arthur G. Beal and Irving W. Reynolds and forming no part of the invention herein claimed.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. In combination with a hollow sensitive device, a clamp engaging the outer wall of the free end thereof having lugs connected by a screw for tensioning the same, and a driven member having arms received beneath the lugs and held thereby against the tube.

2. In combination with a hollow sensitive device, a band engaging the outer wall of the free end thereof, a screw for tensioning the band, and a driven member engaging a part of the band and secured in driven relation to the tube by the screw pressure on the band.

3. In combination with a helical sensitive device having a fixed end and a free end, a substantially coaxial shaft extending therethrough, a radially flexible but circumferentially rigid strip for drivng the shaft from the device, a clamp engaging about the outer wall of the device adjacent the free end thereof having lugs, a screw connecting the lugs, said strip having a slotted end fitting beneath the lugs between the same and the tube.

4. In combination with a helical sensitive device having a fixed end and a free end, a substantially coaxial shaft extending therethrough, an arm for driving the shaft from the device, a clamp engaging about the device adjacent its free end having lugs and a screw for tensioning them toward one another, said arm engaging at least one of said lugs and secured in driven relation to the tube by the pressure of the screw on the lugs.

5. In an instrument of the class described, a helically coiled sensitive tube fixed at its rear end, a substantially coaxial shaft, a radially flexible but circumferentially rigid link secured to the shaft, a band encircling the free end of the tube having broad projecting lugs at the inner circumference and a screw for tensioning said lugs together exposed for manipulation at the front, said link having an end slotted to form arms entering from the rear beneath the lugs between the same and the tube and thereby secured to the tube.

In testimony whereof, we have signed our names to this specification.

CHARLES J. MIDDLETON.
ARTHUR G. BEAL.